United States Patent
Choi

(10) Patent No.: US 11,531,910 B2
(45) Date of Patent: Dec. 20, 2022

(54) ARTIFICIAL INTELLIGENCE SERVER

(71) Applicant: LG ELECTRONICS INC., Seoul (KR)

(72) Inventor: Yoohyun Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 399 days.

(21) Appl. No.: 16/805,263

(22) Filed: Feb. 28, 2020

(65) Prior Publication Data
US 2021/0089943 A1 Mar. 25, 2021

(30) Foreign Application Priority Data
Sep. 20, 2019 (KR) .................. 10-2019-0116079

(51) Int. Cl.
*G06N 5/04* (2006.01)
*G06N 20/00* (2019.01)
*F25D 29/00* (2006.01)
*G06F 3/14* (2006.01)
*G06V 20/10* (2022.01)

(52) U.S. Cl.
CPC .............. *G06N 5/04* (2013.01); *F25D 29/00* (2013.01); *G06F 3/14* (2013.01); *G06N 20/00* (2019.01); *G06V 20/10* (2022.01)

(58) Field of Classification Search
CPC ........ F25D 2700/06; F25D 29/00; G06F 3/14; G06F 3/147; G06K 9/6271; G06N 20/00; G06N 3/08; G06N 5/04; G06V 10/82; G06V 20/10; G06V 20/20
See application file for complete search history.

(56) References Cited

U.S. PATENT DOCUMENTS

| | | | | |
|---|---|---|---|---|
| 7,196,625 | B1 * | 3/2007 | Nguyen | F25D 29/00 340/3.1 |
| 9,965,798 | B1 * | 5/2018 | Vaananen | F25D 27/005 |
| 2002/0066279 | A1 * | 6/2002 | Kiyomatsu | H04L 67/12 62/125 |
| 2008/0147611 | A1 * | 6/2008 | Bennett | G06Q 30/00 |
| 2009/0258331 | A1 * | 10/2009 | Do | G09B 21/003 434/127 |
| 2014/0172894 | A1 * | 6/2014 | Argue | G06Q 30/02 707/758 |
| 2014/0193783 | A1 * | 7/2014 | Jeong | F25D 29/00 434/127 |
| 2016/0162715 | A1 * | 6/2016 | Luk | F25D 29/00 235/385 |
| 2018/0089540 | A1 * | 3/2018 | Merler | G06K 9/6268 |

* cited by examiner

*Primary Examiner* — Kashif Siddiqui
(74) *Attorney, Agent, or Firm* — Birch, Stewart, Kolasch & Birch, LLP

(57) ABSTRACT

An artificial intelligence server can include a communication interface configured to communicate with a display device and a refrigerator; and a processor configured to in response to the display device displaying an image including a dish, acquire dish information about the dish included in the image displayed on the display device, receive, from the refrigerator, available ingredient information about ingredients in the refrigerator, and transmit, to the display device, information about making the dish by using the ingredients in the refrigerator.

16 Claims, 12 Drawing Sheets

ARTIFICIAL INTELLIGENCE SERVER

CROSS-REFERENCE TO RELATED APPLICATIONS

This application claims priority to Korean Patent Application No. 10-2019-0116079 filed in the Republic of Korea on Sep. 20, 2019, the entire contents of which are hereby incorporated by reference in their entirety.

BACKGROUND

The present disclosure relates to an artificial intelligence server capable of providing a recipe to a user based on the ingredients available in a refrigerator when a user watching a television illustrates an interest in a dish in an image.

Artificial intelligence (AI) is a field of computer science and information technology that studies how to enable computers to perform things like thinking, learning, and self-development that human intelligence can perform and means enabling computers to imitate human intelligent behavior.

In addition, artificial intelligence does not exist by itself but is directly or indirectly related to other fields of computer science. Particularly in modern times, attempts are being actively made to introduce artificial intelligence elements in various fields of information technology and use the artificial intelligence elements to solve problems in those fields.

In addition, technologies for recognizing and learning the surrounding situation using artificial intelligence and providing the information desired by a user in the desired form or performing a desired operation or function by the user have been actively researched.

An electronic device providing such various operations and functions may be referred to as an artificial intelligence device.

Recently, users can access various recipes and are cooking using recipes. However, in general, a recipe search through a user's terminal manipulation is performed, which is a problem that causes inconvenience to the user because a separate action of the user is required.

SUMMARY

The present disclosure is to solve the above-described problems, an object of the present disclosure, when a user watching television illustrates an interest in a dish in the image, is to provide an artificial intelligence server that can provide a recipe to the user based on the ingredients in the refrigerator.

An artificial intelligence server according to an embodiment of the present disclosure includes a communicator configured to communicate with a display device and a refrigerator; and a processor configured to acquire information about a dish included in an image when the image displayed on the display device is received from the display device, receive information about ingredients in the refrigerator from the refrigerator, and transmit information indicating that it is possible to make the dish by using the ingredients in the refrigerator to the display device.

DETAILED DESCRIPTION OF THE EMBODIMENTS

Figure 1:
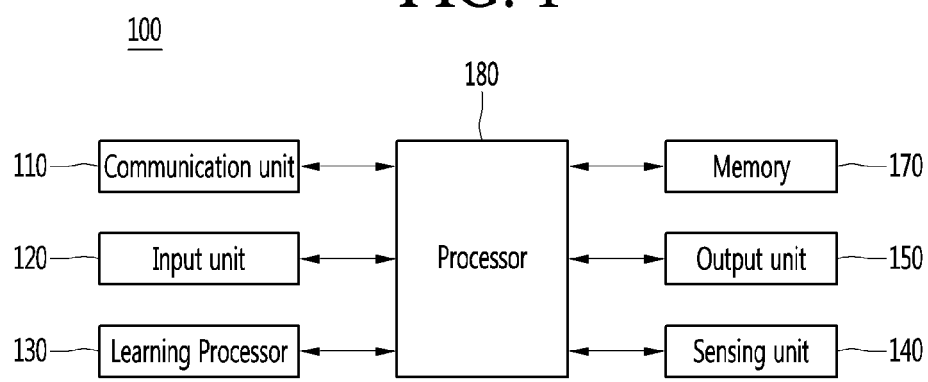
FIG. 1 illustrates an AI device 100 according to an embodiment of the present disclosure.

Hereinafter, embodiments of the present disclosure are described in more detail with reference to accompanying drawings and regardless of the drawings symbols, same or similar components are assigned with the same reference numerals and thus overlapping descriptions for those are omitted. The suffixes "module" and "unit" for components used in the description below are assigned or mixed in consideration of easiness in writing the specification and do not have distinctive meanings or roles by themselves. In the following description, detailed descriptions of well-known functions or constructions will be omitted since they would obscure the invention in unnecessary detail. Additionally, the accompanying drawings are used to help easily understanding embodiments disclosed herein but the technical idea of the present disclosure is not limited thereto. It should be understood that all of variations, equivalents or substitutes contained in the concept and technical scope of the present disclosure are also included.

It will be understood that the terms "first" and "second" are used herein to describe various components but these components should not be limited by these terms. These terms are used only to distinguish one component from other components.

In this disclosure below, when one part (or element, device, etc.) is referred to as being 'connected' to another part (or element, device, etc.), it should be understood that the former can be 'directly connected' to the latter, or 'electrically connected' to the latter via an intervening part (or element, device, etc.). It will be further understood that when one component is referred to as being 'directly connected' or 'directly linked' to another component, it means that no intervening component is present.

<Artificial Intelligence (AI)>

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for learning data is given, and the label may mean the correct answer (or result value) that the artificial neural network infers when the learning data is input to the artificial neural network. The unsupervised learning may refer to a method of learning an artificial neural network in a state in which a label for learning data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep running is part of machine running. In the following, machine learning is used to mean deep running.

<Robot>

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driving unit may include an actuator or a motor and may perform various physical operations such as moving a robot joint. In addition, a movable robot may include a wheel, a brake, a propeller, and the like in a driving unit, and may travel on the ground through the driving unit or fly in the air.

<Self-Driving>

Self-driving refers to a technique of driving for oneself, and a self-driving vehicle refers to a vehicle that travels without an operation of a user or with a minimum operation of a user.

For example, the self-driving may include a technology for maintaining a lane while driving, a technology for automatically adjusting a speed, such as adaptive cruise control, a technique for automatically traveling along a predetermined route, and a technology for automatically setting and traveling a route when a destination is set.

The vehicle may include a vehicle having only an internal combustion engine, a hybrid vehicle having an internal combustion engine and an electric motor together, and an electric vehicle having only an electric motor, and may include not only an automobile but also a train, a motorcycle, and the like.

At this time, the self-driving vehicle may be regarded as a robot having a self-driving function.

<eXtended Reality (XR)>

Extended reality is collectively referred to as virtual reality (VR), augmented reality (AR), and mixed reality (MR). The VR technology provides a real-world object and background only as a CG image, the AR technology provides a virtual CG image on a real object image, and the MR technology is a computer graphic technology that mixes and combines virtual objects into the real world.

The MR technology is similar to the AR technology in that the real object and the virtual object are shown together. However, in the AR technology, the virtual object is used in the form that complements the real object, whereas in the MR technology, the virtual object and the real object are used in an equal manner.

The XR technology may be applied to a head-mount display (HMD), a head-up display (HUD), a mobile phone, a tablet PC, a laptop, a desktop, a TV, a digital signage, and the like. A device to which the XR technology is applied may be referred to as an XR device.

FIG. 1 illustrates an AI device 100 according to an embodiment of the present disclosure.

The AI device 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI device 100 may include a communication unit 110, an input unit 120, a learning processor 130, a sensing unit 140, an output unit 150, a memory 170, and a processor 180.

The communication unit 110 may transmit and receive data to and from external devices such as other AI devices 100a to 100e and the AI server 200 by using wire/wireless communication technology. For example, the communication unit 110 may transmit and receive sensor information, a user input, a learning model, and a control signal to and from external devices.

The communication technology used by the communication unit 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™ RFID (Radio Frequency Identification), Infrared Data Association (IrDA), ZigBee, NFC (Near Field Communication), and the like.

The input unit 120 may acquire various kinds of data.

At this time, the input unit 120 may include a camera for inputting a video signal, a microphone for receiving an audio signal, and a user input unit for receiving information from a user. The camera or the microphone may be treated as a sensor, and the signal acquired from the camera or the microphone may be referred to as sensing data or sensor information.

The input unit 120 may acquire a learning data for model learning and an input data to be used when an output is acquired by using learning model. The input unit 120 may acquire raw input data. In this situation, the processor 180 or the learning processor 130 may extract an input feature by preprocessing the input data.

The learning processor 130 may learn a model composed of an artificial neural network by using learning data. The learned artificial neural network may be referred to as a learning model. The learning model may be used to an infer result value for new input data rather than learning data, and the inferred value may be used as a basis for determination to perform a certain operation.

At this time, the learning processor 130 may perform AI processing together with the learning processor 240 of the AI server 200.

At this time, the learning processor 130 may include a memory integrated or implemented in the AI device 100. Alternatively, the learning processor 130 may be implemented by using the memory 170, an external memory directly connected to the AI device 100, or a memory held in an external device.

The sensing unit 140 may acquire at least one of internal information about the AI device 100, ambient environment information about the AI device 100, and user information by using various sensors.

Examples of the sensors included in the sensing unit 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output unit 150 may generate an output related to a visual sense, an auditory sense, or a haptic sense.

At this time, the output unit 150 may include a display unit for outputting time information, a speaker for outputting auditory information, and a haptic module for outputting haptic information.

The memory 170 may store data that supports various functions of the AI device 100. For example, the memory 170 may store input data acquired by the input unit 120, learning data, a learning model, a learning history, and the like.

The processor 180 may determine at least one executable operation of the AI device 100 based on information determined or generated by using a data analysis algorithm or a machine learning algorithm. The processor 180 may control the components of the AI device 100 to execute the determined operation.

To this end, the processor 180 may request, search, receive, or utilize data of the learning processor 130 or the memory 170. The processor 180 may control the components of the AI device 100 to execute the predicted operation or the operation determined to be desirable among the at least one executable operation.

When the connection of an external device is required to perform the determined operation, the processor 180 may generate a control signal for controlling the external device and may transmit the generated control signal to the external device.

The processor 180 may acquire intention information for the user input and may determine the user's requirements based on the acquired intention information.

The processor 180 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 240 of the AI server 200, or may be learned by their distributed processing.

The processor 180 may collect history information including the operation contents of the AI apparatus 100 or the user's feedback on the operation and may store the collected history information in the memory 170 or the learning processor 130 or transmit the collected history information to the external device such as the AI server 200. The collected history information may be used to update the learning model.

The processor 180 may control at least part of the components of AI device 100 to drive an application program stored in memory 170. Furthermore, the processor 180 may operate two or more of the components included in the AI device 100 in combination to drive the application program.

Figure 2:
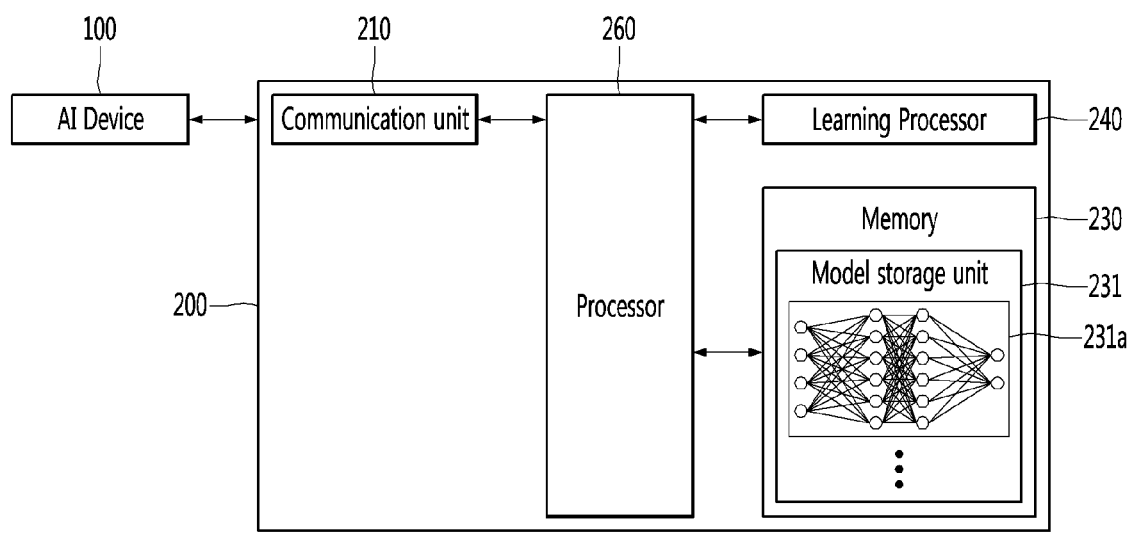
FIG. 2 illustrates an AI server 200 according to an embodiment of the present disclosure.

FIG. 2 illustrates an AI server 200 according to an embodiment of the present disclosure.

Referring to FIG. 2, the AI server 200 may refer to a device that learns an artificial neural network by using a machine learning algorithm or uses a learned artificial neural network. The AI server 200 may include a plurality of servers to perform distributed processing, or may be defined as a 5G network. At this time, the AI server 200 may be included as a partial configuration of the AI device 100, and may perform at least part of the AI processing together.

The AI server 200 may include a communication unit 210, a memory 230, a learning processor 240, a processor 260, and the like.

The communication unit 210 can transmit and receive data to and from an external device such as the AI device 100.

The memory 230 may include a model storage unit 231. The model storage unit 231 may store a learning or learned model (or an artificial neural network 231a) through the learning processor 240.

The learning processor 240 may learn the artificial neural network 231a by using the learning data. The learning model may be used in a state of being mounted on the AI server 200 of the artificial neural network, or may be used in a state of being mounted on an external device such as the AI device 100.

The learning model may be implemented in hardware, software, or a combination of hardware and software. If all or part of the learning models are implemented in software, one or more instructions that constitute the learning model may be stored in memory 230.

The processor 260 may infer the result value for new input data by using the learning model and may generate a response or a control command based on the inferred result value.

Figure 3:
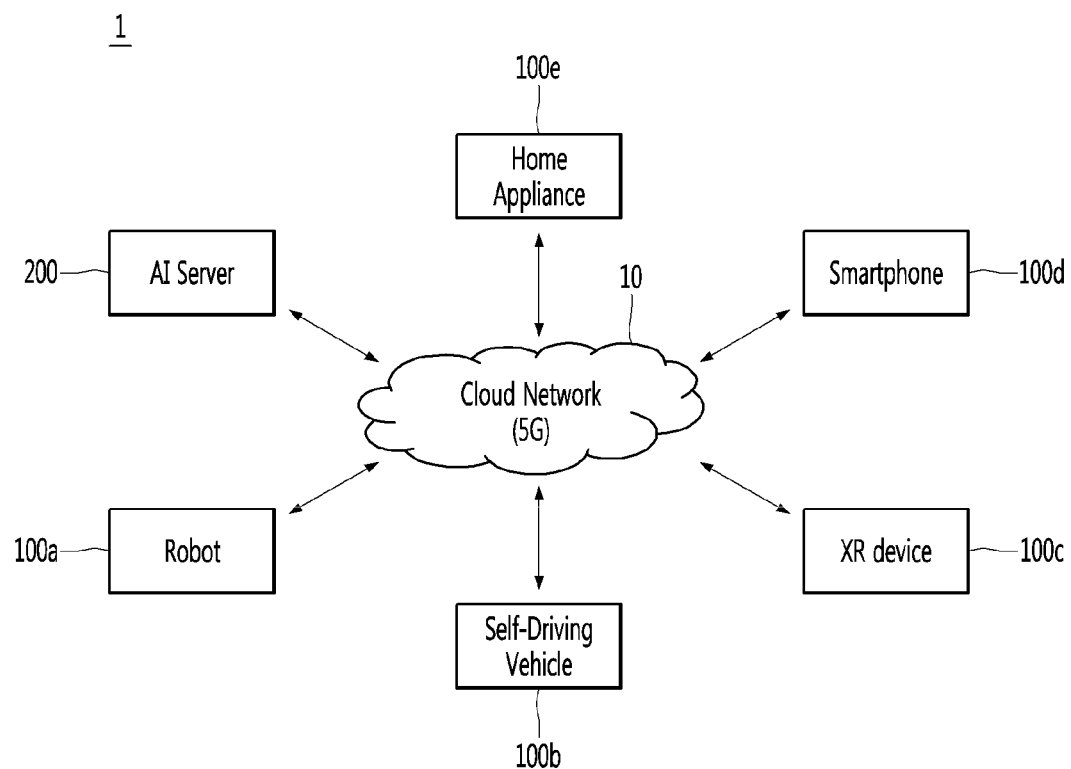
FIG. 3 illustrates an AI system 1 according to an embodiment of the present disclosure.

FIG. 3 illustrates an AI system 1 according to an embodiment of the present disclosure.

Referring to FIG. 3, in the AI system 1, at least one of an AI server 200, a robot 100a, a self-driving vehicle 100b, an XR device 100c, a smartphone 100d, or a home appliance 100e is connected to a cloud network 10. The robot 100a, the self-driving vehicle 100b, the XR device 100c, the smartphone 100d, or the home appliance 100e, to which the AI technology is applied, may be referred to as AI devices 100a to 100e.

The cloud network 10 may refer to a network that forms part of a cloud computing infrastructure or exists in a cloud computing infrastructure. The cloud network 10 may be configured by using a 3G network, a 4G or LTE network, or a 5G network.

That is, the devices 100a to 100e and 200 configuring the AI system 1 may be connected to each other through the cloud network 10. In particular, each of the devices 100a to 100e and 200 may communicate with each other through a base station, but may directly communicate with each other without using a base station.

The AI server 200 may include a server that performs AI processing and a server that performs operations on big data.

The AI server 200 may be connected to at least one of the AI devices constituting the AI system 1, that is, the robot 100a, the self-driving vehicle 100b, the XR device 100c, the smartphone 100d, or the home appliance 100e through the cloud network 10, and may assist at least part of AI processing of the connected AI devices 100a to 100e.

At this time, the AI server 200 may learn the artificial neural network according to the machine learning algorithm instead of the AI devices 100a to 100e, and may directly store the learning model or transmit the learning model to the AI devices 100a to 100e.

At this time, the AI server 200 may receive input data from the AI devices 100a to 100e, may infer the result value for the received input data by using the learning model, may generate a response or a control command based on the inferred result value, and may transmit the response or the control command to the AI devices 100a to 100e.

Alternatively, the AI devices 100a to 100e may infer the result value for the input data by directly using the learning model, and may generate the response or the control command based on the inference result.

Hereinafter, various embodiments of the AI devices 100a to 100e to which the above-described technology is applied will be described. The AI devices 100a to 100e illustrated in FIG. 3 may be regarded as a specific embodiment of the AI device 100 illustrated in FIG. 1.

<AI+Robot>

The robot 100a, to which the AI technology is applied, may be implemented as a guide robot, a carrying robot, a cleaning robot, a wearable robot, an entertainment robot, a pet robot, an unmanned flying robot, or the like.

The robot 100a may include a robot control module for controlling the operation, and the robot control module may refer to a software module or a chip implementing the software module by hardware.

The robot 100a may acquire state information about the robot 100a by using sensor information acquired from various kinds of sensors, may detect (recognize) surrounding environment and objects, may generate map data, may determine the route and the travel plan, may determine the response to user interaction, or may determine the operation.

The robot 100a may use the sensor information acquired from at least one sensor among the lidar, the radar, and the camera to determine the travel route and the travel plan.

The robot 100a may perform the above-described operations by using the learning model composed of at least one artificial neural network. For example, the robot 100a may recognize the surrounding environment and the objects by using the learning model, and may determine the operation by using the recognized surrounding information or object information. The learning model may be learned directly from the robot 100a or may be learned from an external device such as the AI server 200.

At this time, the robot 100a may perform the operation by generating the result by directly using the learning model, but the sensor information may be transmitted to the external device such as the AI server 200 and the generated result may be received to perform the operation.

The robot 100a may use at least one of the map data, the object information detected from the sensor information, or the object information acquired from the external apparatus to determine the travel route and the travel plan, and may control the driving unit such that the robot 100a travels along the determined travel route and travel plan.

The map data may include object identification information about various objects arranged in the space in which the robot 100a moves. For example, the map data may include object identification information about fixed objects such as walls and doors and movable objects such as pollen and desks. The object identification information may include a name, a type, a distance, and a position.

In addition, the robot 100a may perform the operation or travel by controlling the driving unit based on the control/interaction of the user. At this time, the robot 100a may acquire the intention information of the interaction due to the user's operation or speech utterance, and may determine the response based on the acquired intention information, and may perform the operation.

<AI+Self-Driving>

The self-driving vehicle 100b, to which the AI technology is applied, may be implemented as a mobile robot, a vehicle, an unmanned flying vehicle, or the like.

The self-driving vehicle 100b may include a self-driving control module for controlling a self-driving function, and the self-driving control module may refer to a software module or a chip implementing the software module by hardware. The self-driving control module may be included in the self-driving vehicle 100b as a component thereof, but may be implemented with separate hardware and connected to the outside of the self-driving vehicle 100b.

The self-driving vehicle 100b may acquire state information about the self-driving vehicle 100b by using sensor information acquired from various kinds of sensors, may detect (recognize) surrounding environment and objects, may generate map data, may determine the route and the travel plan, or may determine the operation.

Like the robot 100a, the self-driving vehicle 100b may use the sensor information acquired from at least one sensor among the lidar, the radar, and the camera to determine the travel route and the travel plan.

In particular, the self-driving vehicle 100b may recognize the environment or objects for an area covered by a field of view or an area over a certain distance by receiving the sensor information from external devices, or may receive directly recognized information from the external devices.

The self-driving vehicle 100b may perform the above-described operations by using the learning model composed of at least one artificial neural network. For example, the self-driving vehicle 100b may recognize the surrounding environment and the objects by using the learning model, and may determine the traveling movement line by using the recognized surrounding information or object information. The learning model may be learned directly from the self-driving vehicle 100a or may be learned from an external device such as the AI server 200.

At this time, the self-driving vehicle 100b may perform the operation by generating the result by directly using the learning model, but the sensor information may be transmitted to the external device such as the AI server 200 and the generated result may be received to perform the operation.

The self-driving vehicle 100b may use at least one of the map data, the object information detected from the sensor information, or the object information acquired from the external apparatus to determine the travel route and the travel plan, and may control the driving unit such that the self-driving vehicle 100b travels along the determined travel route and travel plan.

The map data may include object identification information about various objects arranged in the space (for example, road) in which the self-driving vehicle 100b travels. For example, the map data may include object identification information about fixed objects such as street lamps, rocks, and buildings and movable objects such as vehicles and pedestrians. The object identification information may include a name, a type, a distance, and a position.

In addition, the self-driving vehicle 100b may perform the operation or travel by controlling the driving unit based on the control/interaction of the user. At this time, the self-driving vehicle 100b may acquire the intention information of the interaction due to the user's operation or speech utterance, and may determine the response based on the acquired intention information, and may perform the operation.

<AI+XR>

The XR device 100c, to which the AI technology is applied, may be implemented by a head-mount display (HMD), a head-up display (HUD) provided in the vehicle, a television, a mobile phone, a smartphone, a computer, a wearable device, a home appliance, a digital signage, a vehicle, a fixed robot, a mobile robot, or the like.

The XR device 100c may analyzes three-dimensional point cloud data or image data acquired from various sensors or the external devices, generate position data and attribute data for the three-dimensional points, acquire information about the surrounding space or the real object, and render to output the XR object to be output. For example, the XR device 100c may output an XR object including the additional information about the recognized object in correspondence to the recognized object.

The XR device 100c may perform the above-described operations by using the learning model composed of at least one artificial neural network. For example, the XR device 100c may recognize the real object from the three-dimensional point cloud data or the image data by using the learning model, and may provide information corresponding to the recognized real object. The learning model may be directly learned from the XR device 100c, or may be learned from the external device such as the AI server 200.

At this time, the XR device 100c may perform the operation by generating the result by directly using the learning model, but the sensor information may be transmitted to the external device such as the AI server 200 and the generated result may be received to perform the operation.

<AI+Robot+Self-Driving>

The robot 100a, to which the AI technology and the self-driving technology are applied, may be implemented as a guide robot, a carrying robot, a cleaning robot, a wearable robot, an entertainment robot, a pet robot, an unmanned flying robot, or the like.

The robot 100a, to which the AI technology and the self-driving technology are applied, may refer to the robot itself having the self-driving function or the robot 100a interacting with the self-driving vehicle 100b.

The robot 100a having the self-driving function may collectively refer to a device that moves for itself along the given movement line without the user's control or moves for itself by determining the movement line by itself.

The robot 100a and the self-driving vehicle 100b having the self-driving function may use a common sensing method to determine at least one of the travel route or the travel plan. For example, the robot 100a and the self-driving vehicle 100b having the self-driving function may determine at least one of the travel route or the travel plan by using the information sensed through the lidar, the radar, and the camera.

The robot 100a that interacts with the self-driving vehicle 100b exists separately from the self-driving vehicle 100b and may perform operations interworking with the self-driving function of the self-driving vehicle 100b or interworking with the user who rides on the self-driving vehicle 100b.

At this time, the robot 100a interacting with the self-driving vehicle 100b may control or assist the self-driving function of the self-driving vehicle 100b by acquiring sensor information about behalf of the self-driving vehicle 100b and providing the sensor information to the self-driving vehicle 100b, or by acquiring sensor information, generating environment information or object information, and providing the information to the self-driving vehicle 100b.

Alternatively, the robot 100a interacting with the self-driving vehicle 100b may monitor the user boarding the self-driving vehicle 100b, or may control the function of the self-driving vehicle 100b through the interaction with the user. For example, when it is determined that the driver is in a drowsy state, the robot 100a may activate the self-driving function of the self-driving vehicle 100b or assist the control of the driving unit of the self-driving vehicle 100b. The function of the self-driving vehicle 100b controlled by the robot 100a may include not only the self-driving function but also the function provided by the navigation system or the audio system provided in the self-driving vehicle 100b.

Alternatively, the robot 100a that interacts with the self-driving vehicle 100b may provide information or assist the function to the self-driving vehicle 100b outside the self-driving vehicle 100b. For example, the robot 100a may provide traffic information including signal information and the like, such as a smart signal, to the self-driving vehicle 100b, and automatically connect an electric charger to a charging port by interacting with the self-driving vehicle 100b like an automatic electric charger of an electric vehicle.

<AI+Robot+XR>

The robot 100a, to which the AI technology and the XR technology are applied, may be implemented as a guide robot, a carrying robot, a cleaning robot, a wearable robot, an entertainment robot, a pet robot, an unmanned flying robot, a drone, or the like.

The robot 100a, to which the XR technology is applied, may refer to a robot that is subjected to control/interaction in an XR image. In this situation, the robot 100a may be separated from the XR device 100c and interwork with each other.

When the robot 100a, which is subjected to control/interaction in the XR image, may acquire the sensor information from the sensors including the camera, the robot 100a or the XR device 100c may generate the XR image based on the sensor information, and the XR device 100c may output the generated XR image. The robot 100a may operate based on the control signal input through the XR device 100c or the user's interaction.

For example, the user can confirm the XR image corresponding to the time point of the robot 100a interworking remotely through the external device such as the XR device 100c, adjust the self-driving travel path of the robot 100a through interaction, control the operation or driving, or confirm the information about the surrounding object.

<AI+Self-Driving+XR>

The self-driving vehicle 100b, to which the AI technology and the XR technology are applied, may be implemented as a mobile robot, a vehicle, an unmanned flying vehicle, or the like.

The self-driving driving vehicle 100b, to which the XR technology is applied, may refer to a self-driving vehicle having a means for providing an XR image or a self-driving vehicle that is subjected to control/interaction in an XR image. Particularly, the self-driving vehicle 100b that is subjected to control/interaction in the XR image may be distinguished from the XR device 100c and interwork with each other.

The self-driving vehicle 100b having the means for providing the XR image may acquire the sensor information from the sensors including the camera and output the generated XR image based on the acquired sensor information. For example, the self-driving vehicle 100b may include an HUD to output an XR image, thereby providing a passenger with a real object or an XR object corresponding to an object in the screen.

At this time, when the XR object is output to the HUD, at least part of the XR object may be outputted to overlap the actual object to which the passenger's gaze is directed. Meanwhile, when the XR object is output to the display provided in the self-driving vehicle 100b, at least part of the XR object may be output to overlap the object in the screen. For example, the self-driving vehicle 100b may output XR objects corresponding to objects such as a lane, another vehicle, a traffic light, a traffic sign, a two-wheeled vehicle, a pedestrian, a building, and the like.

When the self-driving vehicle 100b, which is subjected to control/interaction in the XR image, may acquire the sensor information from the sensors including the camera, the self-driving vehicle 100b or the XR device 100c may generate the XR image based on the sensor information, and the XR device 100c may output the generated XR image. The self-driving vehicle 100b may operate based on the control signal input through the external device such as the XR device 100c or the user's interaction.

Figure 4:
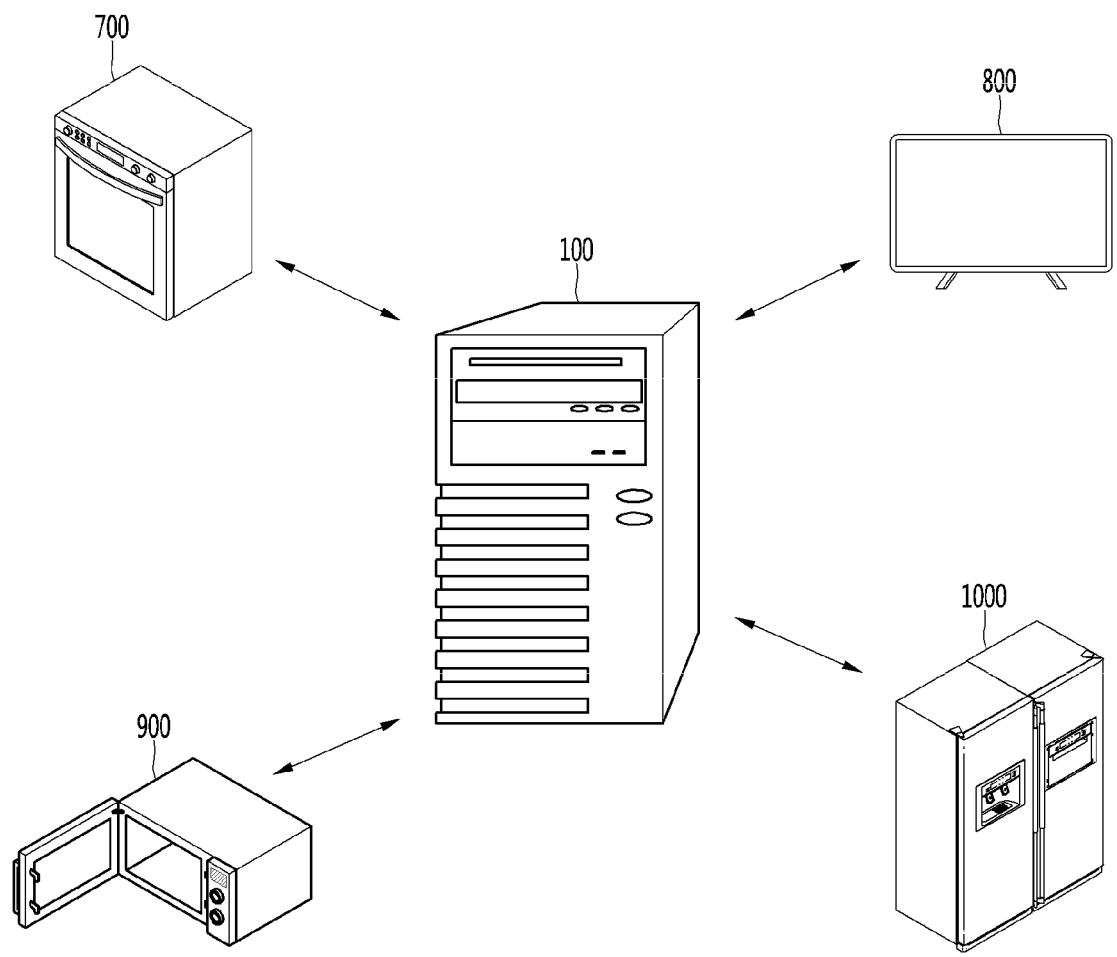
FIG. 4 is a view for explaining an artificial intelligence system according to an embodiment of the present disclosure.

FIG. 4 is a view for explaining an artificial intelligence system according to an embodiment of the present disclosure.

The artificial intelligence system 10 may include at least one of an artificial intelligence server 100, one or more cooking devices 700 and 900, a display device 800, and a refrigerator 1000.

The artificial intelligence server 100, the one or more cooking devices 700 and 900, the display device 800, and the refrigerator 1000 include some or all of the configuration of the AI device 100 described with reference to FIG. 1 and may perform functions performed by the AI device 100.

In addition, the term AI device 100 may be used interchangeably with the term artificial intelligence server 100.

Also, the display device 800 may be a television.

On the other hand, the cooking device may be a device that can perform cooking by setting a cooking mode, a cooking temperature, or a cooking time and heating the ingredients, such as a gas stove, an electric stove, a microwave oven, an induction, a hybrid, a highlight, or the like.

The artificial intelligence server 100 communicates with one or more cooking devices 700 and 900, the display device 800, and the refrigerator 1000 through a communication unit, thereby providing one or more cooking devices 700 and 900, the display device 800, and the refrigerator 1000 may transmit/receive data. To this end, the artificial intelligence server 100 may include a communication circuit for communication.

The artificial intelligence server 100 may receive an image from the display device 800 and transmit information about recipes and dishes to the display device 800.

In addition, the artificial intelligence server 100 may receive information about ingredients in the refrigerator 1000 from the refrigerator 1000.

In addition, the artificial intelligence server 100 may communicate with its own or external database to search the recipe stored in the database.

In addition, the artificial intelligence server 100 may communicate with an ingredient provider server, and transmit the order command of the ingredients to the ingredient provider server.

In addition, the artificial intelligence server 100 may transmit setting information including at least one of a cooking mode, a cooking temperature, and a cooking time to one or more cooking devices.

Figure 5:
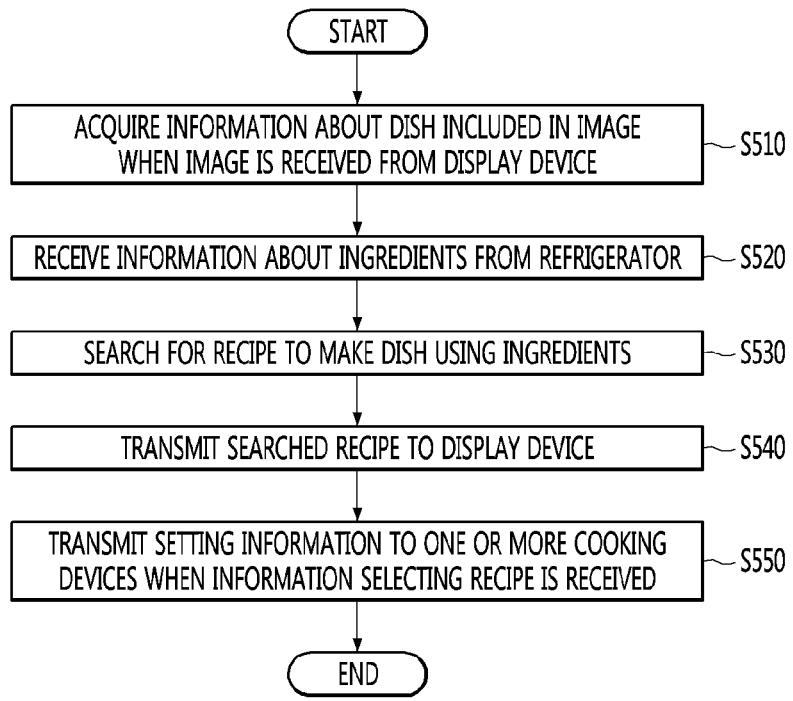
FIG. 5 is a view for explaining an operation method of the artificial intelligence server 100 according to an embodiment of the present disclosure.

FIG. 5 is a view for explaining an operation method of the artificial intelligence server 100 according to an embodiment of the present disclosure.

According to FIG. 5, in the method for operating an artificial intelligence server according to an embodiment of the present disclosure, when an image displayed on the display device is received from the display device, acquiring S510 information about a dish included in the image, receiving S520 information about the ingredients in the refrigerator from the refrigerator, searching S530 for a recipe for making a dish using the ingredients in the refrigerator, transmitting S540 the searched recipe to the display device and when the recipe selection information is received from the display device, transmitting S550 the setting information including at least one of a cooking mode, a cooking temperature, and a cooking time to one or more cooking devices used to make a dish based on the searched recipe.

Figure 6:
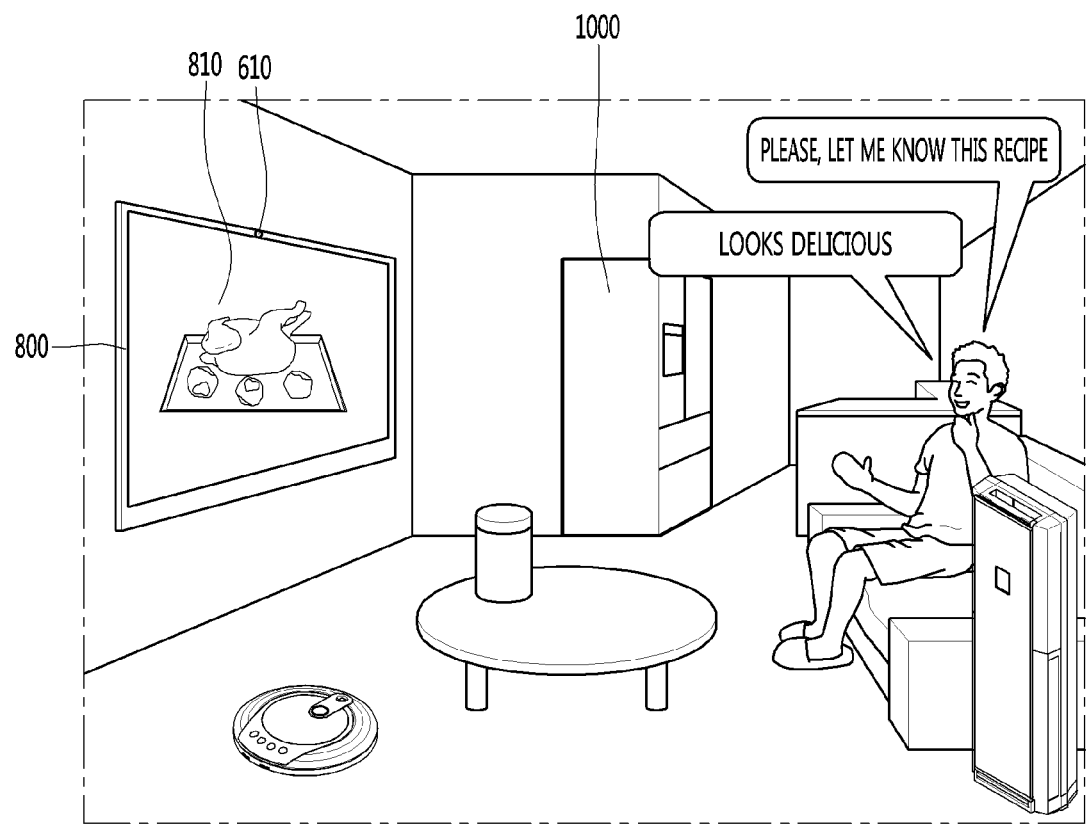
FIG. 6 is a view for explaining a method for transmitting an image displayed according to a recipe request of a user, according to an embodiment of the present disclosure.

FIG. 6 is a view for explaining a method for transmitting an image displayed according to a recipe request of a user, according to an embodiment of the present disclosure.

The processor of the display device 800 may display an image. Here, the image may be an image of broadcast content.

In addition, the processor of the display device 800 may receive a recipe request of a user who watches an image.

In more detail, a user who watches an image displayed on the display device 800 may request a recipe when the cooking 810 that is interested in the image is included.

In this situation, the processor of the display device 800 may receive a speech input for requesting a recipe through a microphone of the input unit or a gesture input for requesting a recipe through the camera 610 of the input unit. For another example, the processor of the display device 800 may receive a button input for requesting a recipe via a remote controller and a communication unit.

In addition, the recipe request may include a response of a user who shows interest in a dish as well as a request for providing a recipe.

For example, the recipe request may include not only uttering an utterance sentence such as a "tell me about this recipe" for the displayed dish 810, but also an utterance sentence "tasteful" for the displayed dish 810.

In addition, when a recipe request of a user who watches an image is received, the processor of the display device 800 may transmit the displayed image to the artificial intelligence server 100. The image to be displayed may be an image displayed when a user's recipe request is received.

Figure 7:
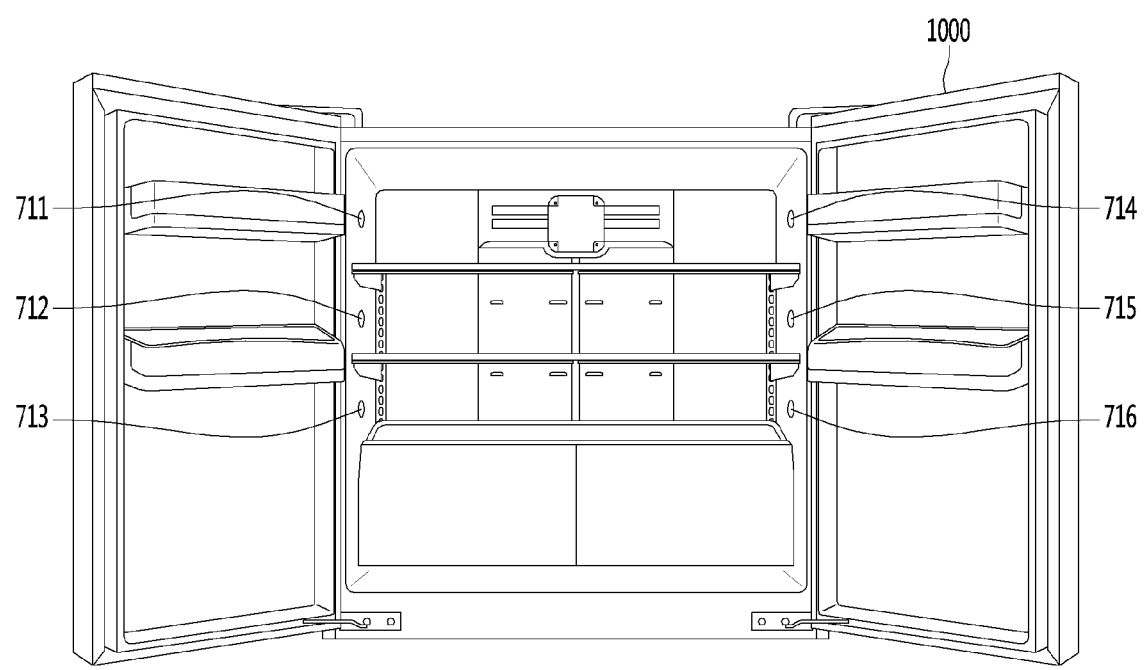
FIG. 7 is a view for explaining a method for transmitting information about ingredients in a storage space according to an embodiment of the present disclosure.

FIG. 7 is a view for explaining a method for transmitting information about ingredients in a storage space according to an embodiment of the present disclosure.

The processor of the refrigerator 1000 may image ingredients located in a storage space of the refrigerator by using one or more cameras 711, 712, 713, 714, 715, and 716.

The processor of the refrigerator 1000 may transmit information about ingredients in the storage space to the artificial intelligence server 100.

The information about the ingredients may be an image of the ingredients.

In this situation, the artificial intelligence server 100 may receive an image acquired by ingredients being photographed and acquire identification information of ingredients existing in the storage space using the image acquired by ingredients being photographed. Here, the identification information of the ingredients may include names of ingredients existing in storage space, or a unique identification code indicating the ingredient, and the like.

For example, the processor of the artificial intelligence server 100 may perform object recognition on an image photographed with ingredients, and determine that there are raw chicken, potato, sweet potato, and carrot in the storage space.

In addition, the information about the ingredients to be transmitted to the artificial intelligent server 100 may include identification information of the ingredients present in the storage space. In detail, the processor of the refrigerator 1000 may acquire identification information of the ingredients existing in the storage space by using the image acquired by the ingredients being photographed. In addition, the processor of the refrigerator 1000 may transmit identification information of the ingredients existing in the storage space to the artificial intelligence server 100.

Figure 8:
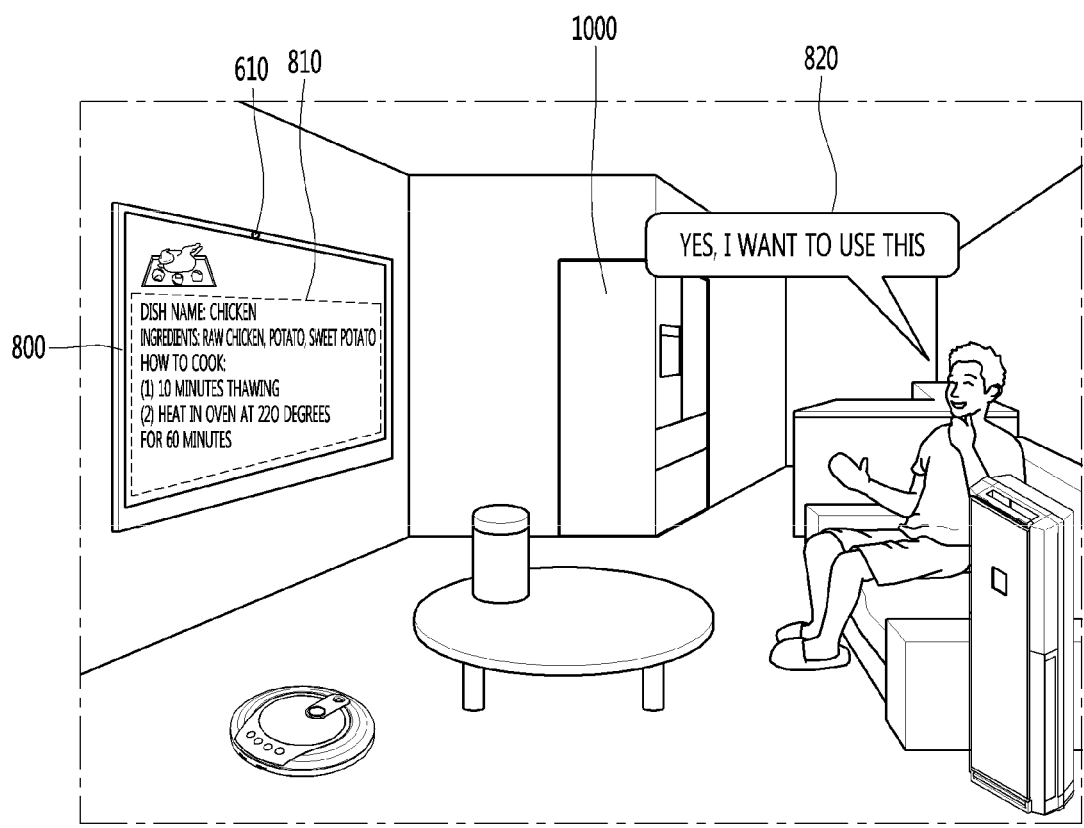
FIG. 8 is a view for explaining a method for searching for a recipe based on food ingredients in a refrigerator and providing the recipe to a user who watches an image according to an embodiment of the present disclosure.

FIG. 8 is a view for explaining a method for searching for a recipe based on food ingredients in a refrigerator and providing the recipe to a user who watches an image according to an embodiment of the present disclosure.

The processor of the artificial intelligence server 100 may receive an image displayed on the display device 100.

As described above, the received image may be received from the display device according to a recipe request of a user watching the image and may be an image displayed when a recipe request of the user is received.

In addition, the artificial intelligence server 100 acquires information about the dish by performing object recognition on the received image but is not limited thereto.

In more detail, the display device 100 may receive program information that is currently being broadcast along with a broadcast signal. The program information may include information about a dish included in the image. In this situation, the display device 100 may transmit information about the dish included in the image to the artificial intelligence server 100.

In addition, the processor of the artificial intelligence server 100 may acquire information about a dish included in the image by using the received image.

In more detail, the processor of the artificial intelligence server 100 may perform object recognition on the received image to acquire information about the dish included in the image. Here, the information about the dish may include a name of the dish, a unique identification code indicating the dish, and the like.

In addition, the processor of the artificial intelligence server 100 may receive information about ingredients in the refrigerator from the refrigerator.

As an example, the refrigerator 1000 may transmit information about ingredients in the refrigerator to the artificial intelligence server 100 when the ingredients in the storage space of the refrigerator are changed. In this situation, the artificial intelligence server 100 may receive information about ingredients in the refrigerator and store the information in the memory.

In another embodiment, when an image displayed on the display device is received from the display device, the processor of the artificial intelligence server 100 may transmit a request for information about food ingredients to the refrigerator 1000. In this situation, the processor of the refrigerator 1000 may transmit information about ingredients in the refrigerator to the artificial intelligence server 100.

In addition, the processor of the artificial intelligence server 100 may determine whether it is possible to make a dish included in an image using the ingredients in the refrigerator.

In detail, the processor of the artificial intelligence server 100 may search for a recipe for making a dish included in an image.

More specifically, the processor of the artificial intelligence server 100 may communicate with a database in which a plurality of recipes are stored to search for a recipe for making a dish included in an image among a plurality of recipes.

In addition, the processor of the artificial intelligence server 100 may search for a recipe for making a dish included in an image by using ingredients in a refrigerator.

In detail, the processor of the artificial intelligence server 100 may search for a recipe for making a dish included in an image using at least some of the ingredients in the storage space of the refrigerator.

More specifically, the processor of the artificial intelligence server 100 may search for a recipe among the plurality of recipes, in which the ingredients used are the same as some or all of the ingredients in the refrigerator, and the finished dish is the same as the dish included in the image.

When the recipe is searched, the processor of the artificial intelligence server 100 may transmit information indicating that it is possible to make a dish included in an image by using ingredients in the refrigerator, to the display device. In this situation, the processor of the display device 800 may display information indicating that it is possible to make a dish included in an image using the ingredients in the refrigerator. For example, the processor of the display device 800 may display the message "This dish can be made using ingredients in the refrigerator."

On the other hand, the information indicating that it is possible to make a dish included in the image using the ingredients in the refrigerator may include a recipe. In detail, when a recipe is searched, the processor of the artificial intelligence server 100 may transmit the searched recipe to the display device 800.

In addition, the processor of the artificial intelligence server 100 may recommend a recipe in consideration of the age and gender of the user.

In more detail, the processor of the display device 800 may obtain an image a user who watches an image using the camera 610 and acquire user information of the user who watches the image. In addition, the processor of the display device 800 may transmit the user information of the user watching the image to the artificial intelligence server 100.

The processor of the artificial intelligence server 100 may receive user information of a user who watches an image from the display device 800. The user information may include at least one of gender and age of the user watching the image.

In addition, the processor of the artificial intelligence server 100 may search for a recipe corresponding to at least one of gender and age of the user using the user information.

In more detail, the processor of the artificial intelligence server 100 can search for a recipe, among the plurality of recipes, in which the ingredients used is the same as some or all of the ingredients in the refrigerator, in which the finished dish is the same as the dish included in the image, and which has high preference in the gender or age range of the user who watches the image.

When the recipe is searched, the processor of the artificial intelligence server 100 may transmit the searched recipe to the display device 800.

In addition, the processor of the display device 800 may receive the recipe and display the received recipe 810.

In addition, a recipe for making a dish included in an image using ingredients in the refrigerator may not be searched.

In detail, the processor of the artificial intelligence server 100 may search for a recipe, among the plurality of recipes, in which the ingredient used is the same as some or all of the ingredients in the refrigerator and in which the finished dish is the same as the dish included in the image.

If the recipe for making the dish included in the image using the ingredients in the refrigerator is not found from the search, the processor may select a recipe in which the finished dish is the same as the dish included in the image even though the refrigerator does not include all of the ingredients for the recipe. The processor of the artificial intelligence server 100 may compare the ingredients included in the selected recipe with the ingredients in the refrigerator, and transmit an order command for ingredients included in the selected recipe but not present in the refrigerator to the ingredient provider server.

In addition, if a recipe for making a dish included in the image using the ingredients in the refrigerator is not found, the processor of the artificial intelligence server 100 can transmit information indicating that it is impossible to make a dish using the ingredients in the refrigerator to the display device. In this situation, the display device may display information that it is impossible to make a dish using the ingredients in the refrigerator.

The following describes a method for controlling a cooking device according to the recipe if the user selects a recipe.

The processor of the display device 800 may display the received recipe 810.

When the recipe selection input 820 is received from the user after the received recipe is displayed, the processor of the display device 800 may transmit recipe selection information indicating that the recipe displayed on the artificial intelligence server is selected.

In addition, if recipe selection information is received from the display device 800 after the recipe is transmitted to the display device 800, the processor of the artificial intelligence server 100 can transmit setting information to one or more cooking devices used to make a dish based on the searched recipe.

This will be described with reference to FIG. 9.

Figure 9:
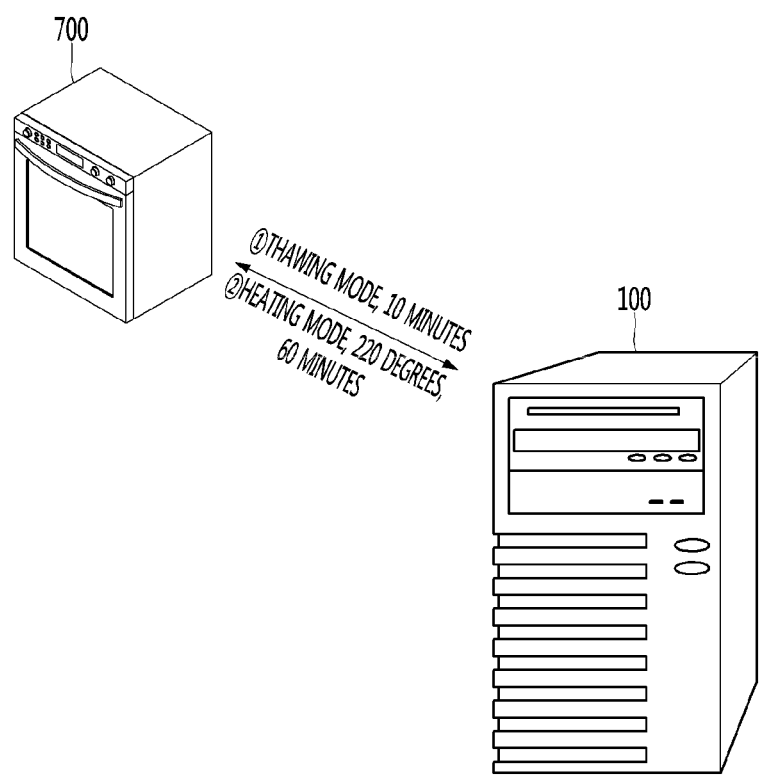
FIG. 9 is a view for explaining a method for transmitting, by the artificial intelligence server 100, setting information to a cooking device according to an embodiment of the present disclosure.

FIG. 9 is a view for explaining a method for transmitting, by the artificial intelligence server 100, setting information to a cooking device according to an embodiment of the present disclosure.

The processor of the artificial intelligence server 100 may determine a cooking device used to make a dish based on the searched recipe.

For example, if the searched recipe includes information that cooking is performed in the oven, the processor of the artificial intelligence server 100 may determine the cooking device used to make the dish as the oven.

In addition, the processor of the artificial intelligence server 100 may determine setting information including at least one of a cooking mode, a cooking temperature, and a cooking time based on the searched recipe.

For example, if the searched recipe includes information "heating at 220 degrees for 60 minutes," the processor of the artificial intelligence server 100 may determine setting information including 220 degrees and 60 minutes.

The processor of the artificial intelligence server 100 may transmit setting information including at least one of a cooking mode, a cooking temperature, and a cooking time to a cooking device used to make a dish.

For example, the processor of the artificial intelligence server 100 can transmit setting information including 220 degrees and 60 minutes to an oven, which is a cooking device 700 used to make a dish among a plurality of cooking devices 700 and 900.

In addition, the cooking device 700 used to make a dish may receive setting information and perform a cooking operation according to the setting information.

In more detail, the cooking device 700 may receive an operation input from a user who inputs ingredients to the cooking device 700. Herein, the operation input may be a button or a touch input for starting operation. In addition, the operation input may include an operation of injecting ingredients into the cooking space of the cooking device 700 or operation of opening and closing the door of the cooking device 700 again.

When the operation input is received, the cooking device 700 may perform a cooking operation according to the received setting information.

For example, if setting information including 220 degrees and 60 minutes is received, the cooking device 700 may perform an operation of heating ingredients for 220 degrees and 60 minutes.

To this end, the cooking device 700 may include at least one of a cooking space in which ingredients are received, a heater for dissipating heat or generating microwaves, and a fan for flowing heated air.

In addition, the processor of the artificial intelligence server 100 may transmit a plurality of setting information to the cooking device 700.

In detail, the processor of the artificial intelligence server 100 may determine the first setting information and the second setting information based on the searched recipe.

For example, if the searched recipe includes the information "first 10 minutes in thawing mode and secondly, heating at 220 degrees for 60 minutes in heating mode", the processor of the artificial intelligence server 100 can generate first setting information including "thawing mode and 10 minutes" and second setting information including "heating mode, 220 degrees and 60 minutes".

In addition, the processor of the artificial intelligence server 100 may transmit the first setting information and the second setting information to the cooking device used to make the dish.

In addition, the processor of the artificial intelligence server 100 may transmit the first setting information and the second setting information so that the cooking device 100 performs cooking according to the cooking order included in the recipe.

In more detail, the processor of the artificial intelligence server 100 may determine the order of the first setting information and the second setting information according to the cooking order included in the recipe.

For example, if the recipe includes the information "firstly, 10 minutes in thawing mode and secondly, heating at 220 degrees for 60 minutes in heating mode", the processor of artificial intelligence server 100 can generate the first setting information of the first order including "thawing mode and 10 minutes" and the second setting information of the second order including "heating mode, 220 degrees, and 60 minutes".

In this situation, the processor of the artificial intelligence server 100 may sequentially transmit the first setting information and the second setting information based on the cooking order included in the recipe.

In detail, the processor of the artificial intelligence server 100 may transmit first setting information of first order, and then transmit second setting information of second order.

In addition, the cooking device 700 may sequentially receive the first setting information and the second setting information, and perform the cooking operation according to the order in which the setting information is received.

Specifically, if the first setting information is received and then the second setting information is received, the cooking device 700 can perform a cooking operation according to the first setting information, and then can perform the cooking operation according to the second setting information.

For example, if the first setting information including "thawing mode and 10 minutes" and the second setting information including "heating mode, 220 degrees, and 60 minutes" are received, the processor of the cooking device 700 can be operated for 10 minutes in the thawing mode, and then can perform heating at 220 degrees for 60 minutes in the heating mode.

Figure 10:
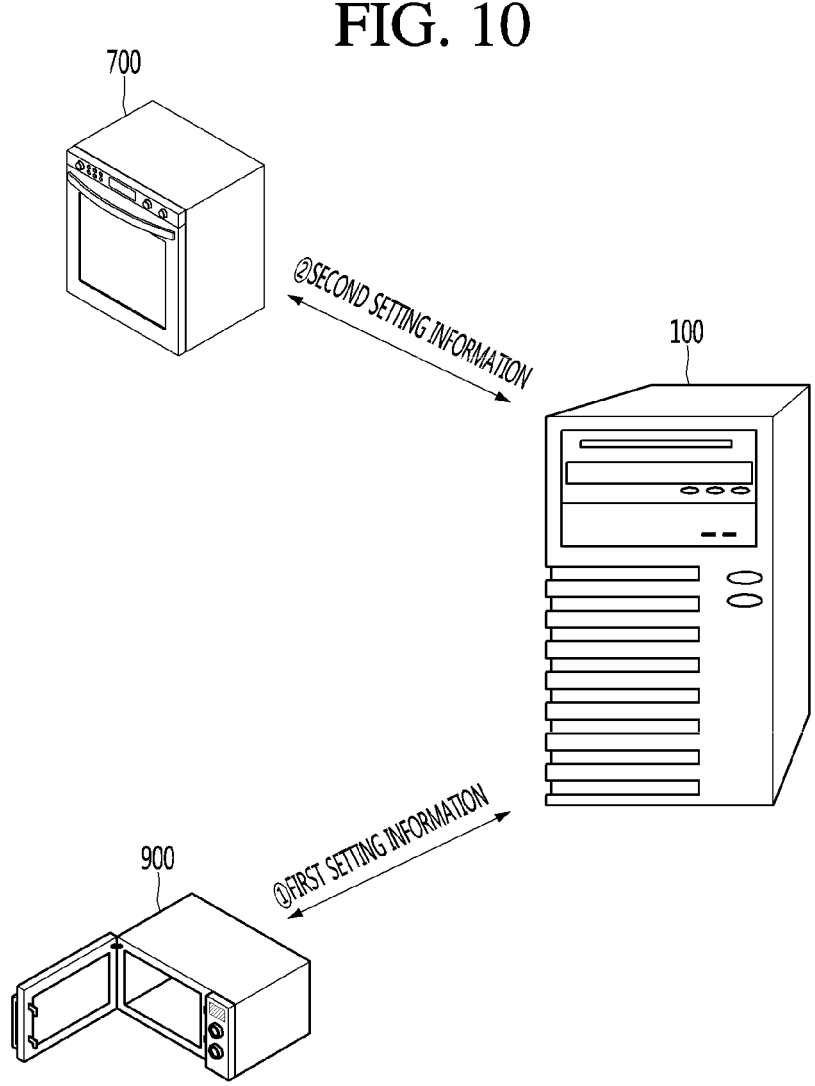
FIG. 10 is a diagram for explaining a method for transmitting setting information to a plurality of cooking devices according to an embodiment of the present disclosure.

FIG. 10 is a diagram for explaining a method for transmitting setting information to a plurality of cooking devices according to an embodiment of the present disclosure.

The processor of the artificial intelligence server 100 may transmit setting information to the plurality of cooking devices 700 and 900.

In detail, the processor of the artificial intelligence server 100 may determine the first setting information and the second setting information based on the searched recipe.

For example, if the searched recipe includes the information "firstly, 10 minutes in thawing mode and secondly, heating at 220 degrees for 60 minutes in heating mode", the processor of the artificial intelligence server 100 can generate the first setting information including "thawing mode and 10 minutes" and the second setting information including "heating mode, 220 degrees, and 60 minutes".

In addition, the processor of the artificial intelligence server 100 may determine a plurality of cooking devices to perform cooking according to the plurality of setting information based on the searched recipe.

For example, if the thawing mode is provided by the microwave oven and the heating mode is provided by the oven, the processor of the artificial intelligence server 100 can determine the cooking device to perform cooking according to the first setting information as the microwave oven, and the cooking device to perform cooking according to the second setting information as the oven.

In addition, the processor of the artificial intelligence server 100 may transmit the first setting information and the second setting information to the first cooking device 900 and the second cooking device 700 used to make a dish, respectively.

In addition, the processor of the artificial intelligence server 100 can transmit the first setting information and the second setting information so that the first cooking device 900 and the second cooking device 700 perform cooking according to the cooking order included in the recipe.

In more detail, the processor of the artificial intelligence server 100 may determine the order of the first setting information and the second setting information according to the cooking order included in the recipe.

In this situation, the processor of the artificial intelligence server 100 may sequentially transmit the first setting information and the second setting information based on the cooking order included in the recipe.

Specifically, the processor of the artificial intelligence server 100 can transmit the first setting information of the first order to the first cooking device 900, and then transmit second setting information of the second order to the second cooking device 700.

More specifically, the processor of the artificial intelligence server 100 can first transmit the first setting information of the first order to the first cooking device 900. In this situation, the first cooking device 900 can perform a cooking operation according to the first setting information, and transmit the operation completion information to the artificial intelligence server 100 when the cooking operation according to the first setting information is completed.

In addition, when the operation completion information is received, the processor of the artificial intelligence server 100 may transmit the second setting information of the second order to the second cooking device 700. In this situation, the second cooking device 700 may perform a cooking operation according to the second setting information.

If the operation is described from the user's point of view, the user may first put the ingredients into the first cooking device 900. In this situation, the first cooking device 900 may automatically perform an operation according to the first setting information.

In addition, when the operation of the first cooking device 900 is completed, the user may take out the ingredients from the first cooking device 900 and then input the ingredients to the second cooking device 700. In this situation, the second cooking device 700 may automatically perform an operation according to the second setting information.

Figure 11:
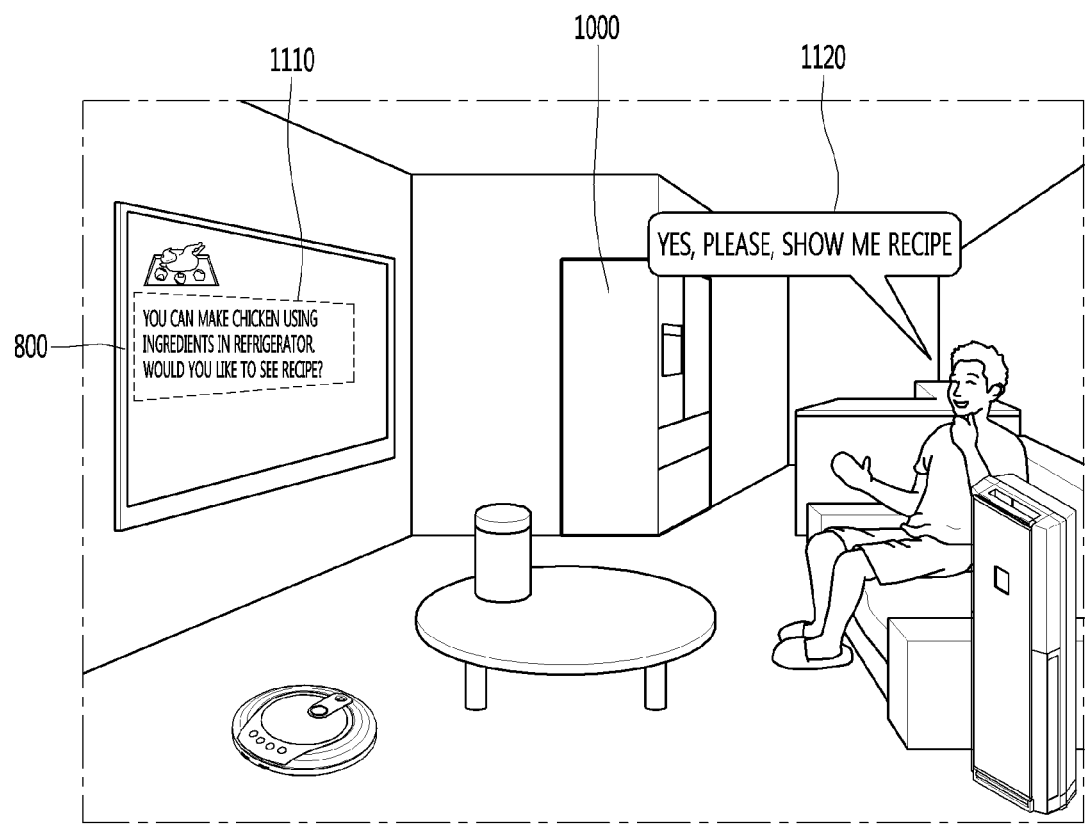
FIG. 11 is a view for explaining a method of recommending a dish to a user watching television using information about ingredients in a refrigerator and providing a recipe thereof according to an embodiment of the present disclosure.

FIG. 11 is a view for explaining a method of recommending a dish to a user watching television using information about ingredients in a refrigerator and providing a recipe thereof according to an embodiment of the present disclosure.

The processor of the artificial intelligence server 100 may receive information about ingredients in the refrigerator from the refrigerator 1000.

In this situation, the processor of the artificial intelligence server 100 may determine a second dish that can be made using ingredients in the refrigerator.

In detail, the processor of the artificial intelligence server 100 may search for a recipe using at least some of the ingredients in the storage space of the refrigerator. In addition, the processor of the artificial intelligence server 100 may determine that the finished dish is a second dish that can be made using the ingredients in the refrigerator through the searched recipe.

In addition, the processor of the artificial intelligence server 100 may transmit information about the second dish to the display device.

In addition, the processor of the display device 800 may receive information about the second dish and display the received information about the second dish 1110.

When the dish selection input 1120 is received from the user after the information 1110 about the second cooking is displayed, the processor of the display device 800 can transmit dish selection information indicating that the cooking is selected to the artificial intelligence server 100.

In addition, when dish selection information is received from the display device 800 after the information about the second dish is transmitted, the processor of the artificial intelligence server 100 can transmit a second recipe corresponding to the second dish to the display device 800.

In detail, the processor of the artificial intelligence server 100 may search for a second recipe for making a second dish by using ingredients in the refrigerator and transmit the searched second recipe to the display device 800.

The recipe searching method described with reference to FIGS. 1 to 10 may be applied to the searching method of the second recipe, and the contents described with reference to FIGS. 1 to 10 may be applied to operation after providing the second recipe to the display device.

In addition, the processor of the artificial intelligence server 100 may determine the second dish based on the information about the user's preferred dish. This will be described with reference to FIG. 12.

Figure 12:
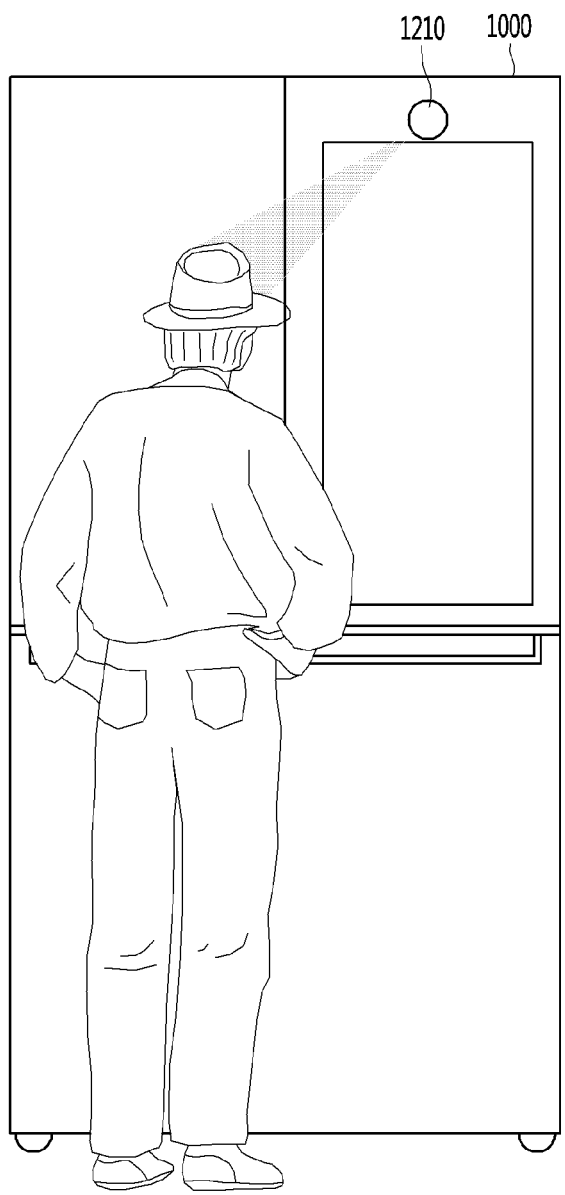
FIG. 12 is a view for explaining a method for acquiring information about a preferred dish of a user according to an embodiment of the present disclosure.

FIG. 12 is a view for explaining a method for acquiring information about a preferred dish of a user according to an embodiment of the present disclosure.

The processor of the artificial intelligence server 100 may acquire information about a user's preferred dish.

In detail, the processor of the refrigerator 1000 may determine a user who opens the door of the refrigerator by using the camera 1210 imaging the front of the refrigerator 1000. In addition, the processor of the refrigerator 1000 may image ingredients located in the storage space of the refrigerator to acquire information about a dish taken out by a user who opens a door of the refrigerator.

In addition, the processor of the refrigerator 1000 may store, in a memory, information about a user who opens the door of the refrigerator and the dish taken out by the user who opens the door of the refrigerator.

In addition, the processor of the refrigerator 1000 may determine the user's preferred dish using information accumulated in the memory.

For example, if the father takes out chicken more than a predetermined number of times, the processor of the refrigerator 1000 may determine the father's preferred dish as the chicken.

In another example, if the mother takes out stew more than a predetermined number of times, the processor of the refrigerator 1000 may determine the mother's preferred dish as the stew.

In addition, the processor of the artificial intelligence server 100 may receive user information of a user who watches an image from the display device 800. In addition, the processor of the artificial intelligence server 100 may receive information about a preferred dish of a user watching an image from the refrigerator 1000.

For example, if the father is watching an image displayed on the display device 800, the processor of the artificial intelligence server 100 may receive information about the father's preferred cooking from the refrigerator 1000.

Then, the processor of the artificial intelligence server 100 selects a second dish from among a plurality of dishes that can be made by using ingredients in the refrigerator by using information about a user's preferred dish for watching an image and may transmit information about the second selected dish to the display device 100.

In detail, the processor of the artificial intelligence server 100 may search for a recipe using at least some of the ingredients in the storage space of the refrigerator. In addition, the processor of the artificial intelligence server 100 may acquire a plurality of dishes capable of making a finished dish using the ingredients in the refrigerator through the searched recipe. The processor of the artificial intelligence server 100 may select a second dish corresponding to a user's preferred dish among a plurality of dishes. Then, the processor of the artificial intelligence server 100 may transmit information about the second dish to the display device 800.

According to the present disclosure, if a user watching an image using the display device shows an interest in the dish in the image, there is an advantage that a recipe for the dish of interest can be provided to the user through the display device.

In addition, according to the present disclosure, since the recipe is provided based on the ingredients in the refrigerator, there is an advantage of providing a recipe that allows the user to cook immediately.

In addition, according to the present disclosure, if the cooking of interest using the ingredients in the refrigerator cannot be made, an order is automatically performed, and thus there is an advantage that can improve the user convenience.

In addition, according to the present disclosure, by not only providing a recipe to the user but also controlling the cooking device according to the recipe, it is possible to provide an environment in which the user performs cooking very simply.

Further, according to the present disclosure, there is an advantage of providing a user with a dish and a recipe for allowing the user to cook immediately by recommending a dish to the user and providing a recipe thereof based on the ingredients in the refrigerator.

The following describes a method for operating an artificial intelligence server.

According to an embodiment of the present disclosure, a method for operating an artificial intelligence server may include receiving an image displayed on a display device from the display device, acquiring information about a dish included in the image, receiving information about ingredients in the refrigerator from a refrigerator, and transmitting information indicating that it is possible to make the dish using the ingredients in the refrigerator to the display device.

In this situation, the information indicating that it is possible to make the dish includes a recipe, and the transmitting the information indicating that it is possible to make the dish to the display device may include searching for the recipe for making the dish using the ingredients in the refrigerator, and transmitting the searched recipe to the display device.

In this situation, the image may be received from the display device according to a recipe request of the user watching the image.

In this situation, the method may further include receiving user information of a user who watches the image from the display device, and the searching the recipe may include searching the recipe corresponding to at least one of gender and age of the user using the user information.

In addition, the information about the ingredients may be an image acquired by imaging the ingredients or identification information of the ingredients present in the refrigerator.

In addition, if a recipe for making the dish is not searched using the ingredients in the refrigerator, the method may further include transmitting an order command of insufficient ingredients to an ingredient provider server.

In addition, the method may further include, after the searched recipe is transmitted to the display device, receiving recipe selection information from the display device, and transmitting setting information including at least one of cooking mode, cooking temperature, and cooking time to a cooking device used to make the dish based on the searched recipe.

In addition, the method may further include, after the searched recipe is transmitted to the display device, receiving recipe selection information from the display device, and transmitting first setting information to the first cooking device based on the cooking order included in the searched recipe and transmitting second setting information to a second cooking device after the first setting information is transmitted.

In addition, the method may further include determining a second dish that can be made using the ingredients in the refrigerator and transmitting information about the second dish to the display device.

In this situation, if the dish selection information is received from the display device after the information about the second dish is transmitted, the method may further include transmitting a second recipe corresponding to the second dish to the display device.

In addition, the determining a second dish that can be made by using the ingredients in the refrigerator may include receiving information about the user's preferred dishes watching the image from the refrigerator, and, by using the information about the user's preferred dishes, selecting the second dish among a plurality of dishes that can be made using the ingredients in the refrigerator.

The following describes the operation of the artificial intelligence system.

In an artificial intelligence system including a display device, an artificial intelligence server, and a refrigerator, the artificial intelligence system includes a display device which displays an image and transmits the displayed image to the artificial intelligence server when a recipe request from a user watching the image is received, a refrigerator for transmitting information about ingredients in a storage space to the artificial intelligence server, and an artificial intelligence server which receives the displayed image, acquires information about a dish included in the received image, and transmits information indicating that it is possible to make the dish using the ingredients to the display device, in which the display device displays information indicating that it is possible to make the dish using the ingredients in the refrigerator.

In this situation, the information indicating that it is possible to make the dish using the ingredients in the refrigerator includes a recipe, and the artificial intelligence server can search for the recipe for making the dish using the ingredients in the refrigerator and transmit the searched recipe to the display device, and the display device may receive the recipe and display the received recipe.

In this situation, the display device can photograph a user watching the displayed image, acquire user information of the user using the photographed image, and transmit the acquired user information to the artificial intelligence server, and the artificial intelligence server may search for the recipe corresponding to at least one of the gender and the age of the user using the user information.

In addition, the artificial intelligence system further includes one or more cooking devices, and the display device transmits recipe selection information to the artificial intelligence server when a recipe selection input is received from the user after the received recipe is displayed, when the recipe selection information is received, the artificial intelligence server transmits setting information including at least one of a cooking mode, a cooking temperature, and a cooking time to a cooking device used to make the dish based on the searched recipe, and the cooking device used to make the dish may perform a cooking operation according to the setting information when the setting information is received.

In addition, the artificial intelligence system further includes a first cooking device and a second cooking device, and the display device can transmit recipe selection information to the artificial intelligence server when a recipe selection input is received from the user after the received recipe is displayed, when the recipe selection information is received, the artificial intelligence server transmits first setting information to a first cooking device based on a cooking order included in the searched recipe, and transmit second setting information to a second cooking device after the first setting information is transmitted, the first cooking device perform a cooking operation according to the first setting information when the first setting information is received, and the second cooking device perform a cooking operation according to the second setting information when the second setting information is received.

In addition, the artificial intelligence server can acquire a second dish that can be made by using the ingredients in the refrigerator and transmit information about the second dish to the display device, and the display device can display information about the second dish.

In this situation, if the dish selection input is received from the user after the information about the second dish is displayed, the display device can transmit dish selection information to the artificial intelligence server, and the artificial intelligence server can transmit a second recipe corresponding to the second dish when the dish selection information is received, and the display device can display the second recipe.

In addition, the refrigerator can acquire information about the user's preferred dish by using the information about the dish taken out by the user who opens the door of the refrigerator, and transmit the information about the user's preferred dish to the artificial intelligence server, and the artificial intelligence server can select the second dish among a plurality of dishes that can be made by using ingredients in the refrigerator by using information about the preferred dish of the user.

Figure 13:
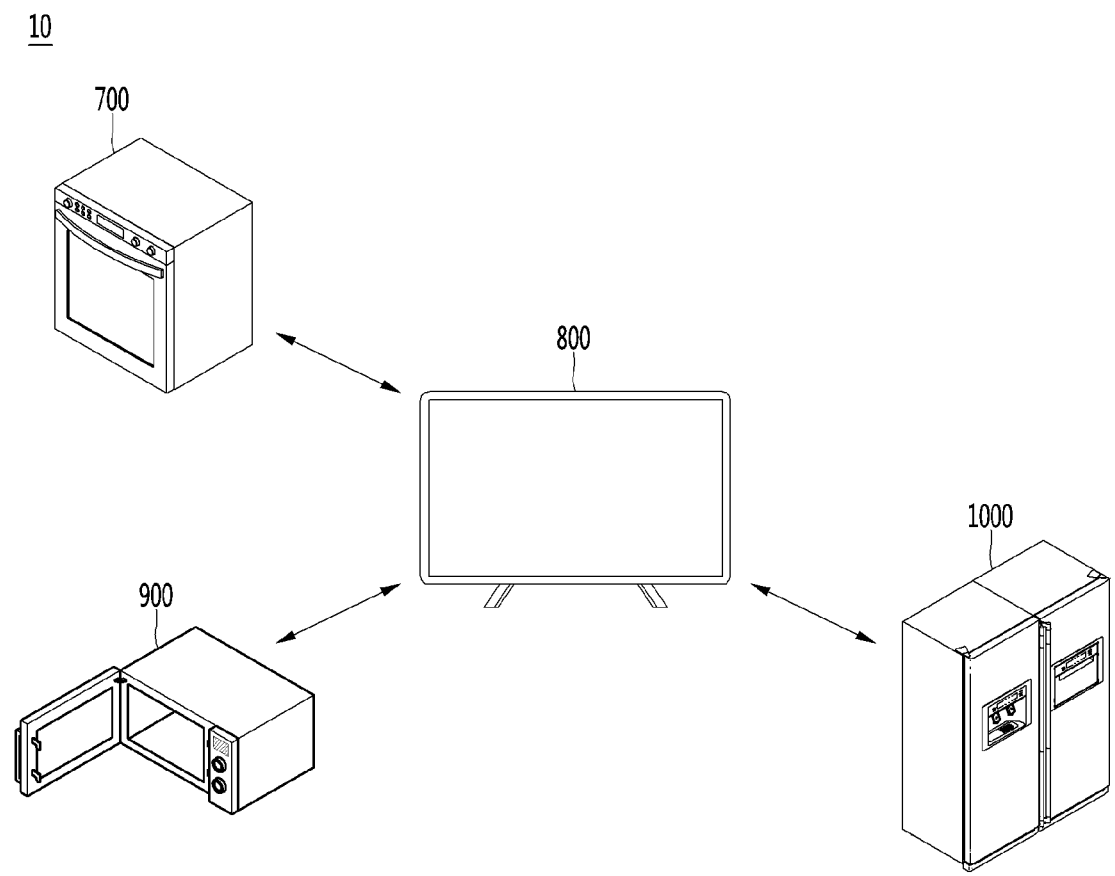
FIG. 13 is a view explaining an artificial intelligence system except for the artificial intelligence server 100 according to another embodiment of the present disclosure.

FIG. 13 is a diagram illustrating an artificial intelligence system except for the artificial intelligence server 100 according to another exemplary embodiment of the present disclosure.

The artificial intelligence system 10 does not include an artificial intelligence server, but anyone of the first cooking device 700, the second cooking device 900, the display device 800, and the refrigerator 1000 can perform the operation of the artificial intelligence server described in FIGS. 1 to 12.

Hereinafter, it is assumed that the display device 800 performs the operation of the artificial intelligence server, and the operation of the display device 800 will be briefly described.

In an artificial intelligence system including a display device and a refrigerator, the artificial intelligence system includes a refrigerator which transmits information about ingredients in a storage space to a display device, and a display device which displays an image, acquires information about a dish included in the displayed image when a recipe request of a user who watches an image is received and acquires and displays information indicating that it can make the dish by using ingredients in the refrigerator.

In this situation, when a recipe request of a user who watches an image is received, the display device can acquire information about a dish included in the displayed image, search for a recipe for making the dish using ingredients in the storage space, and display the searched recipe.

In this situation, the display device can photograph a user watching the displayed image, acquire user information of the user using the photographed image, and search for a recipe corresponding at least one of gender and age of the user using the user information.

In addition, the artificial intelligence system further includes one or more cooking devices, and the display device can transmit setting information including at least one of a cooking mode, a cooking temperature, and a cooking time to the cooking device used to make the dish based on the searched recipe when a recipe selection input is received from the user after the searched recipe is displayed, and the cooking device used to make the dish can perform a cooking operation according to the setting information when the setting information is received.

In addition, the artificial intelligence system may further include a first cooking device and a second cooking device, and the display device can transmit first setting information to the first cooking device based on cooking order including the searched recipe when a recipe selection input is received from the user after the searched recipe is displayed, and transmit second setting information to the second cooking device after the first setting information is transmitted, the first cooking device can perform the cooking operation according to the first setting information when the first setting information is received, and the second cooking device can perform the cooking operation according to the second setting information when the second setting information is received.

In addition, the display device may acquire a second dish that can be made using the ingredients in the refrigerator and display information about the second dish.

In this situation, when the dish selection input is received from the user after the information about the second dish is displayed, the display device may display a second recipe corresponding to the second dish.

In addition, the refrigerator can acquire information about the user's preferred dishes by using the information about the dishes taken out by the user who opens the door of the refrigerator and transmit information about the user's preferred dishes to the display device, and the display device can select the second dish among a plurality of dishes that can be made by using ingredients in the refrigerator by using the information about the preferred dish of the user.

The invention may also be embodied as computer readable codes on a computer readable recording medium. The computer readable recording medium is any data storage device that may store data which may be thereafter read by a computer system. Examples of the computer readable recording medium include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. The computer may include the controller 180 of the mobile terminal.

The above exemplary embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

What is claimed is:

1. An artificial intelligence server comprising:
   a communication interface configured to communicate with a display device and a refrigerator; and
   a processor configured to:
   in response to the display device displaying an image including a dish, acquire dish information about the dish included in the image displayed on the display device,
   receive, from the refrigerator, available ingredient information about ingredients in the refrigerator, and
   transmit, to the display device, information about making the dish by using the ingredients in the refrigerator,
   wherein the processor is further configured to:
   receive the image including the dish from the display device based on a recipe request of a user watching the display device;
   search a plurality of recipes to find a recipe for making the dish in the image with the ingredients in the refrigerator; and
   in response to finding the recipe among the plurality of recipes, transmit the recipe to the display device,
   wherein the recipe request includes a response of the user who shows interest in the dish included in the image displayed on the display device, and
   wherein the received image is an image displayed on the display device when the recipe request of the user is received.

2. The artificial intelligence server of claim 1, wherein the processor is further configured to:
   receive user information of the user watching the display device, and
   select the recipe from among the plurality of recipes based on at least one of a gender or age of the user based on the user information.

3. The artificial intelligence server of claim 1, wherein the processor is further configured to:
   transmit, to the display device, information indicating that the dish cannot be made with the ingredients in the refrigerator when a recipe for making the dish with the ingredients in the refrigerator is not found among the plurality of recipes after the search is completed.

4. The artificial intelligence server of claim 1, wherein the processor is further configured to:
in response to receiving recipe selection information from the display device, transmit setting information to a cooking device for making the dish based on the recipe, the setting information including at least one of a cooking mode, a cooking temperature, or a cooking time.

5. The artificial intelligence server of claim 1, wherein the processor is further configured to:
in response to receiving recipe selection information from the display device, transmit first setting information to a first cooking device based on a cooking order included in the recipe and transmit second setting information to a second cooking device based on the cooking order after transmission of the first setting information.

6. The artificial intelligence server of claim 1, wherein the processor is further configured to:
determine a second dish that can be made using the ingredients in the refrigerator, and
transmit information about the second dish to the display device.

7. The artificial intelligence server of claim 6, wherein the processor is further configured to:
in response to receiving cooking selection information from the display device based on the information about the second dish, transmit a second recipe to the display device, the second recipe corresponding to the second dish.

8. The artificial intelligence server of claim 6, wherein the processor is further configured to:
receive preference information about a preferred dish of a user, and
select the second dish from among a plurality of dishes that can be made by using ingredients in the refrigerator based on the preference information.

9. The artificial intelligence server of claim 1, wherein the available ingredient information includes an image of the ingredients in the refrigerator or identification information of the ingredients in the refrigerator.

10. A method for operating an artificial intelligence server, the method comprising:
receiving, from a display device, an image displayed on the display device in response to a recipe request of a user watching the display device;
acquiring dish information about a dish included in the image;
receiving, from a refrigerator, available ingredient information about ingredients in the refrigerator;
searching a plurality of recipes to find a recipe for making the dish in the image with the ingredients in the refrigerator; and
transmitting the recipe to the display device in response to finding the recipe among the plurality of recipes,
wherein the recipe request includes a response of the user who shows interest in the dish included in the image displayed on the display device, and
wherein the received image is an image displayed on the display device when the recipe request of the user is received.

11. The method of claim 10, further comprising:
receiving user information of the user watching the display device; and
selecting the recipe from among the plurality of recipes based on at least one of a gender or age of the user based on the user information.

12. The method of claim 10, further comprising:
transmitting, to the display device, information indicating that the dish cannot be made with the ingredients in the refrigerator when a recipe for making the dish with the ingredients in the refrigerator is not found among the plurality of recipes after the searching is completed.

13. The method of claim 10, further comprising:
in response to receiving recipe selection information from the display device, transmitting setting information to a cooking device for making the dish based on the recipe, the setting information including at least one of a cooking mode, a cooking temperature, or a cooking time.

14. The method of claim 10, further comprising:
in response to receiving recipe selection information from the display device, transmitting first setting information to a first cooking device based on a cooking order included in the recipe and transmitting second setting information to a second cooking device based on the cooking order after transmission of the first setting information.

15. The method of claim 10, further comprising:
determining a second dish that can be made using the ingredients in the refrigerator; and
transmitting information about the second dish to the display device.

16. The method claim 10, wherein the available ingredient information includes an image of the ingredients in the refrigerator or identification information of the ingredients in the refrigerator.

* * * * *